United States Patent
Li

(10) Patent No.: US 11,331,887 B2
(45) Date of Patent: May 17, 2022

(54) POLYOLEFIN-BASED COMPOSITION FOR A LID AND METHODS OF MAKING AND USING

(71) Applicant: DART CONTAINER CORPORATION, Mason, MI (US)

(72) Inventor: Chengtao Li, Novi, MI (US)

(73) Assignee: Dart Container Corporation, Mason, MI (US)

( * ) Notice: Subject to any disclaimer, the term of this patent is extended or adjusted under 35 U.S.C. 154(b) by 460 days.

(21) Appl. No.: 16/292,495

(22) Filed: Mar. 5, 2019

(65) Prior Publication Data
US 2019/0270287 A1  Sep. 5, 2019

Related U.S. Application Data

(60) Provisional application No. 62/638,424, filed on Mar. 5, 2018.

(51) Int. Cl.
| | |
|---|---|
| B32B 27/08 | (2006.01) |
| B32B 27/32 | (2006.01) |
| B32B 27/20 | (2006.01) |
| C08L 23/06 | (2006.01) |
| C08L 23/16 | (2006.01) |
| C08L 23/12 | (2006.01) |
| C08K 3/34 | (2006.01) |

(52) U.S. Cl.
CPC .............. *B32B 27/08* (2013.01); *B32B 27/20* (2013.01); *B32B 27/32* (2013.01); *C08L 23/06* (2013.01); *C08L 23/12* (2013.01); *C08L 23/16* (2013.01); *B32B 2307/546* (2013.01); *B32B 2307/72* (2013.01); *B32B 2435/02* (2013.01); *C08K 3/346* (2013.01)

(58) Field of Classification Search
CPC ...................................................... B32B 27/32
See application file for complete search history.

(56) References Cited

U.S. PATENT DOCUMENTS

| | | | |
|---|---|---|---|
| 4,472,539 A | 9/1984 | Funakoshi et al. | |
| 4,501,843 A | 2/1985 | Needham | |
| 4,567,089 A * | 1/1986 | Hattori ................... | B32B 27/32 |
| | | | 428/213 |
| 4,578,296 A | 3/1986 | Miyazaki et al. | |
| 4,626,456 A | 12/1986 | Farrell et al. | |
| D287,919 S | 1/1987 | Clements | |

(Continued)

FOREIGN PATENT DOCUMENTS

| | | |
|---|---|---|
| CA | 2289767 A1 | 9/1999 |
| CA | 2422565 A1 | 9/2003 |

(Continued)

OTHER PUBLICATIONS

Pongstabodee et al. (Waste Management 28 (2008) 475-483) (Year: 2008).*

*Primary Examiner* — Liam J Heincer
(74) *Attorney, Agent, or Firm* — McGarry Bair PC

(57) ABSTRACT

Aspects of the present disclosure relate to compositions and processes suitable for use in forming a lid for a hot food or beverage container, the lid being made from a multi-layer sheet that includes a substrate layer and a cap layer made from polyolefin-based compositions. The lid has a density less than water at 23° C., allowing the lid to be recycled in a recycling stream.

25 Claims, 3 Drawing Sheets

(56) References Cited

U.S. PATENT DOCUMENTS

| | | | |
|---|---|---|---|
| 4,753,365 A | 6/1988 | Seppala | |
| 4,879,147 A * | 11/1989 | Newman | B32B 27/20 |
| | | | 428/36.4 |
| 4,970,113 A * | 11/1990 | Yamada | B32B 7/04 |
| | | | 428/323 |
| 5,006,394 A * | 4/1991 | Baird | B32B 3/266 |
| | | | 428/138 |
| 5,319,910 A * | 6/1994 | Takata | B32B 7/06 |
| | | | 493/355 |
| 6,096,831 A | 8/2000 | Nagaoka et al. | |
| 6,100,512 A | 8/2000 | Neculescu et al. | |
| 6,120,863 A * | 9/2000 | Neculescu | B29C 48/397 |
| | | | 428/35.7 |
| 6,211,500 B1 | 4/2001 | Cochran, II et al. | |
| 6,403,692 B1 | 6/2002 | Traugott et al. | |
| 6,420,689 B1 | 7/2002 | Cochran, II et al. | |
| 6,446,533 B2 | 9/2002 | Miyano | |
| 6,670,592 B2 | 12/2003 | McCarthy et al. | |
| 6,700,106 B2 | 3/2004 | Cochran, II et al. | |
| 6,733,852 B2 | 5/2004 | Littlejohn et al. | |
| 6,846,533 B2 | 1/2005 | Wu et al. | |
| 6,881,937 B2 | 4/2005 | Swiontek | |
| 6,893,694 B2 | 5/2005 | Wu et al. | |
| 7,482,053 B2 | 1/2009 | Swiontek | |
| 7,754,299 B2 | 7/2010 | Wu et al. | |
| 2006/0289542 A1 * | 12/2006 | Schedl | B29C 66/91421 |
| | | | 220/359.2 |
| 2007/0087212 A1 * | 4/2007 | Iyengar | B32B 29/00 |
| | | | 428/474.4 |
| 2009/0118415 A1 | 5/2009 | Aasetre et al. | |
| 2010/0296757 A1 * | 11/2010 | Yuno | B32B 15/08 |
| | | | 383/116 |
| 2011/0147353 A1 * | 6/2011 | Kornfeld | B65D 77/2056 |
| | | | 219/121.73 |
| 2012/0267368 A1 | 10/2012 | Wu et al. | |
| 2013/0133295 A1 | 5/2013 | Shah et al. | |
| 2013/0133296 A1 | 5/2013 | Metzger | |
| 2015/0143782 A1 | 5/2015 | Shah et al. | |
| 2016/0000243 A1 | 1/2016 | Tedford, Jr. | |
| 2016/0082693 A1 * | 3/2016 | Li | B29B 17/0026 |
| | | | 206/503 |
| 2016/0090218 A1 | 3/2016 | Sun et al. | |
| 2016/0347945 A1 * | 12/2016 | Ho | C08J 3/005 |
| 2019/0106550 A1 * | 4/2019 | Li | C08J 9/0066 |
| 2019/0270287 A1 * | 9/2019 | Li | C08L 23/06 |
| 2019/0359393 A1 * | 11/2019 | Layos | B65D 43/0212 |
| 2020/0047448 A1 * | 2/2020 | Foster | B32B 7/04 |

FOREIGN PATENT DOCUMENTS

| | | |
|---|---|---|
| CA | 2532842 A1 | 8/2006 |
| CA | 2832644 A1 | 10/2013 |
| CA | 2954062 A1 | 12/2016 |
| CA | 2958323 A1 | 2/2017 |
| CN | 106905612 A | 6/2017 |
| EP | 2699630 A1 | 2/2014 |
| EP | 3164337 A1 | 5/2017 |
| MX | 2013012104 A | 5/2014 |
| MX | 2017001871 A | 6/2017 |
| TW | 201300229 A | 1/2013 |
| WO | 2012145359 A1 | 10/2012 |
| WO | 2016003603 A1 | 1/2016 |

* cited by examiner

POLYOLEFIN-BASED COMPOSITION FOR A LID AND METHODS OF MAKING AND USING

CROSS-REFERENCE TO RELATED APPLICATIONS

This application claims the benefit of U.S. Provisional Patent Application No. 62/638,424, filed on Mar. 5, 2018, which is incorporated herein by reference in its entirety.

BACKGROUND

Polystyrene is commonly used for forming disposable containers, cups, lids, and other food service articles. Polystyrene has a stiffness and heat resistance suitable for use in making food service articles for use in hot food service, such as lids for hot beverage cups and soup bowls. However, polystyrene can be challenging to recycle, dissuading some consumers from purchasing products made using polystyrene. In the United States, an increasing number of municipalities are banning or placing restrictions on the use of polystyrene in food service articles due at least in part to poor public perception.

BRIEF SUMMARY

According to one aspect, a lid for a food or beverage container is formed from a multi-layer sheet including a substrate layer including a first polyolefin-based composition and a cap layer including a second polyolefin-based composition. The lid has a density less than 1 g/cm$^3$ at 23° C.

According to one aspect, a process for forming a lid for a food or beverage container includes extruding a substrate layer comprising a first polyolefin-based composition, co-extruding a cap layer adjacent a first side of the substrate layer to form a multi-layer sheet, the cap layer comprising a second polyolefin-based composition, and forming the multi-layer sheet into the shape of a lid having a density less than 1 g/cm$^3$ at 23° C.

DETAILED DESCRIPTION

Aspects of the present disclosure relate to a polyolefin-based composition and processes suitable for use in forming a lid for a food service container having properties that make the lid suitable for use in hot food service, such as a hot food or hot beverage container. The polyolefin-based lids of the present disclosure are suitable for replacing conventional lids made using high impact polystyrene (HIPS) that are typically used in hot food service applications. In addition, the polyolefin-based composition and processes of the present disclosure provide a polyolefin-based lid having a density less than water at temperatures and pressures typically encountered in a water-based recycling stream. This allows the polyolefin-based lid of the present disclosure to be recyclable using conventional practices that rely on capturing recyclable material floating in a recycling stream.

Aspects of the present disclosure relate to polyolefin-based compositions for forming a multi-layer polyolefin-based sheet having a stiffness suitable for use in forming a lid for a hot beverage or food container in combination with a density suitable for recycling. The polyolefin-based compositions can be used to form a multi-layer polyolefin-based sheet that can be thermoformed or molded into the desired lid shape. While aspects of the present disclosure are discussed in the context of a lid for use with a cup intended to hold a hot liquid, aspects of the present disclosure can be used in a similar manner to form a multi-layer polyolefin-based sheet that can be thermoformed or molded into the shape of other articles, such as soup container lids, for example. In addition, aspects of the present disclosure are not limited to use with hot food and beverages, but may be used with room temperature or chilled food and beverages.

Figure 1:
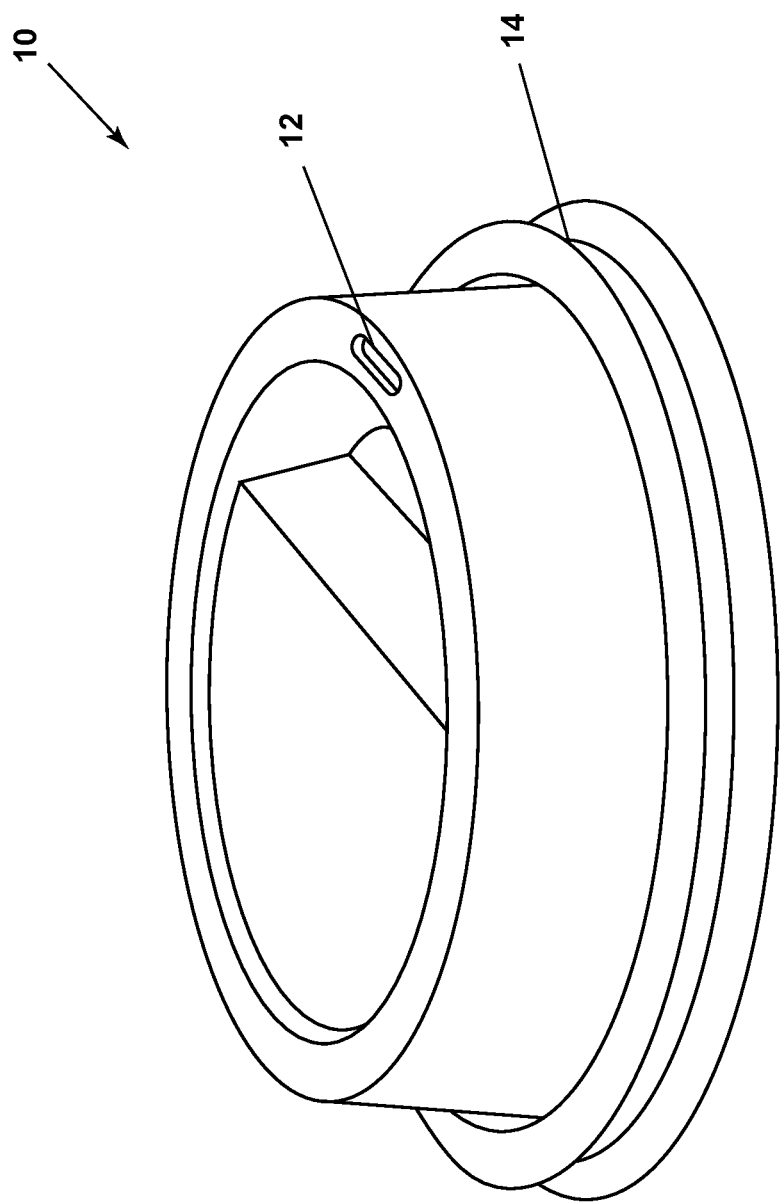
FIG. 1 is a perspective view of an exemplary hot cup lid according to an aspect of the disclosure.

FIG. 1 illustrates an exemplary cup lid 10 that may be formed by thermoforming a multi-layer polyolefin-based sheet according to an aspect of the present disclosure. The cup lid 10 includes conventional features such as a drink opening 12 and a skirt 14. The cup lid 10 can have the same shape as a conventional dome-shaped cup lid that is used with a cup intended to hold a hot beverage, such as coffee or tea. The multi-layer polyolefin-based sheet can be used to form lids having other shapes, including other dome-shaped, flat, or frusto-conical shaped lids in a manner similar to what is described in the present disclosure.

Conventional hot beverage cup lids are often made using unexpanded high impact polystyrene (HIPS). Cup lids made by thermoforming HIPS sheets have a high heat deflection temperature (HDT), also referred to as high heat resistance. A material having a high HDT, such as HIPS, increases the resistance of the lid to heat distortion that can occur when the lid is placed on a container holding a hot liquid or when the lid is reheated, such as when the container and lid are placed in a microwave for heating the contents of the container. Polyolefins, such as polypropylene, generally have a flexural modulus less than that of HIPS, particularly at hot food service temperatures, and thus typically present a challenge for use in forming a hot cup lid. A cup lid made using a polypropylene having a low flexural modulus may become soft and/or weaken when the cup lid is placed on a cup holding a hot liquid or when the cup lid is reheated.

Figure 2:
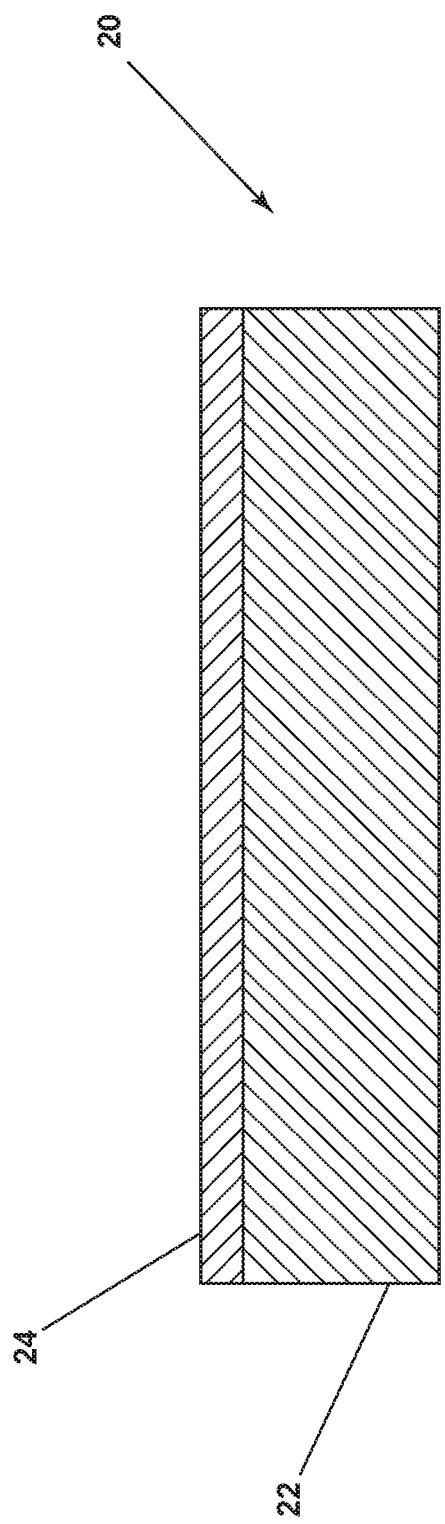
FIG. 2 is a cross-sectional view of a multi-layer sheet according to an aspect of the disclosure.

Referring to FIG. 2, the cup lid 10 according to the present disclosure is made from a multi-layer sheet 20 that includes a substrate layer 22 and a cap layer 24. The substrate layer 22 is made from a substrate composition that is a polyolefin-based composition that includes at least one filler and at least one polyolefin. The cap layer 24 is made from a cap composition that is a polyolefin-based composition that includes at least one filler and at least one polyolefin that is different than the polyolefin(s) in the substrate layer 22. The multi-layer sheet 20 can be formed by co-extruding the substrate composition and the cap composition to form the substrate layer 22 and cap layer 24. The cap layer 24 can be co-extruded to form an exterior side of the lid 10, i.e., the side facing away from an interior of a container upon which the lid 10 is mounted.

The multi-layer sheet 20 can then be shaped into a lid having a stiffness that is at least comparable to a similar lid made from unexpanded HIPS at temperatures typically experienced by lids used in hot food service. Hot food service temperatures are typically considered to be about 90° C. or greater. As used herein, comparable is used to refer to a characteristic that is within +/−20%, optionally within +/−15%, further optionally within +/−10%, and further optionally within +/−5% of the reference material or article. As used herein, a lid is similar to another lid when the lid dimensions and part weight are comparable such that the similar lids can be used interchangeably on a container.

The substrate composition forming the substrate layer 22 includes a polyolefin-based composition that includes at least a primary polyolefin material and at least one filler, and optionally other additives, which can be combined to form a blend suitable for extrusion through a die. The cap composition forming the cap layer 22 includes a polyolefin-based composition that includes a polyethylene-based material in combination with at least one polypropylene-based material and at least one filler, and optionally other additives, which can be combined to form a blend suitable for co-extrusion with the substrate composition. Optionally, one or both of the substrate and cap compositions can include a secondary, tertiary, or any additional number of polyolefin-based materials. As used herein, the primary polyolefin material is defined as the polyolefin or blend of polyolefins that forms the majority of the composition. Secondary, tertiary, etc. polyolefin materials, when present, are present in an amount equal to or less than the primary polyolefin material.

Extrusion refers to a process for shaping or forming an article by moving material through a die opening by forcing, pressing, and/or pushing the material through the die opening. The die opening can be an orifice having any desired shape, such as a slit. The substrate and cap compositions can be co-extruded through the die into the multi-layer sheet 20 or a cylinder that is subsequently cut to form a sheet of the multi-layer sheet 20 for shaping into a lid. Extrusion can be performed continuously to form a long sheet or cylinder or can be semi-continuous such that multiple shorter segments are produced for later shaping into a lid. The lid production process may include in-line extrusion thermoforming or off-line extrusion thermoforming. Extrusion can be performed using a single screw extruder or a twin screw extruder, although the present disclosure is not limited to any particular extrusion device or die. Co-extrusion is used herein in accordance with the normal meaning ascribed to the term in the art of polymeric materials and refers to a process by which a first extrudate and a second extrudate are coupled with a single die head and the first and second extrudates are extruded together through the die to form a multi-layer material.

In one aspect of the present disclosure, thermoforming is performed on the extruded sheet exiting the extruder while the material is still in a molten/heated form from the extrusion process. The molten sheets from the extruder can be thermoformed. In another aspect, the extruded sheets can be allowed to cool to room temperature and solidify following extrusion. The solidified sheets can then be reheated for forming using a reciprocating former, for example.

Non-limiting examples of suitable primary polyolefin materials for use in the substrate composition forming the substrate layer 22 include polypropylene homopolymers, polypropylene copolymers, and combinations thereof. Copolymers of polypropylene for use in the substrate composition can include copolymers in which the polymer is derived from propylene monomers and at least one other propylene monomer or a block copolymer derived from blocks of propylene monomers and blocks derived from at least one other propylene. The polypropylene can be linear or branched. Optionally, additional polypropylene homopolymers and/or polypropylene copolymers may be present as secondary or tertiary polyolefin materials. As used herein, the terms polypropylene, polypropylene-based, and propylene-based are used interchangeably to refer to any polymeric material including blocks, chains, and/or branches based on the monomer unit propylene and includes both homopolymers and copolymers, unless otherwise specified.

According to one aspect of the present disclosure, the primary polyolefin material of the substrate composition includes a polypropylene that is a high modulus polypropylene homopolymer having a flexural modulus of at least about 290,000 psi, optionally at least about 300,000 psi, as measured according to ASTM D-790A. Optionally, the primary polyolefin is a high crystalline polypropylene characterized by low xylene solubles (XS), which is generally considered to be related to isotacticity and crystallinity. Optionally, the primary polyolefin is a high crystalline polypropylene characterized by a crystallinity of about 52.5% or greater and having a crystallization peak temperature above 132° C. When compared to standard homopolymer resins, high crystalline polypropylene exhibits a higher stiffness and increased chemical and heat resistance. In one aspect, the polyolefin is a high crystalline polypropylene having a flexural modulus of at least about 290,000 psi, optionally at least about 300,000 psi, and further optionally about 290,000 to 300,000 psi, as measured according to ASTM D-790A. In another aspect, polypropylenes having an HDT of at least about 95° C., optionally at least about 105° C., further optionally at least about 115° C. at 66 psi, as measured according to ASTM D648, may be used. An example of a commercially available polyolefin suitable from the substrate composition includes Inspire® 6025N from Braskem, U.S.A. The polypropylene can be present in the substrate composition in a range of about 80 to 90 percent by (wt. %) of the substrate composition.

In one aspect of the present disclosure, the primary polyolefin material of the substrate composition includes at least one polypropylene having a flexural modulus of at least about 290,000 psi, optionally at least about 300,000 psi, an HDT of at least about 95° C., optionally at least about 105° C., further optionally at least about 115° C., and/or a modulus of elasticity of at least about 160,000 psi, optionally at least about 210,000 psi, further optionally at least about 230,000 psi.

Non-limiting examples of suitable polyethylene-based material for use in the cap composition forming the cap layer 24 include ethylene-propylene copolymers, polyethylene, high density polyethylene, or combinations thereof. The polypropylene in the cap composition can be the same or different than the primary polypropylene in the substrate composition. The polyethylene-based material can be present in the cap composition in an amount equal to, less than, or greater than the polypropylene. The polyethylene-based material and the polypropylene can be pre-blended and combined with the remaining materials of the cap composition or provided separately to the mixture of materials forming the cap composition and blended. The blend of polyethylene-based material and polypropylene can be present in the cap composition in a range of about 65 to 80 wt. % of the cap composition. Optionally, the cap composition can include one or more additional polypropylenes (e.g., secondary, tertiary, etc.).

As used herein, the terms polyethylene, polyethylene-based, and ethylene-based are used interchangeably to refer to any polymeric material including blocks, chains, and/or branches based on the monomer unit ethylene and includes both homopolymers and copolymers, unless otherwise specified. An example of a suitable commercially available blend of a polyethylene-based material and polypropylene for use in the cap composition is Polybatch® DUL3636 from Schulman, which is described as a blend of polypropylene and polyethylene. According to one aspect of the present disclosure, the polypropylene/polyethylene blend has a melt tangent delta at 230° C. in the range of about 1-2.5. According to one aspect of the present disclosure, the polypropylene/polyethylene blend has a melt complex viscosity at 230° C. in the range of about 6000-7500 Pa·sec. In one aspect, the polypropylene/polyethylene blend has a melt tangent delta at 230° C. in the range of about 1-2.5 in combination with a melt complex viscosity at 230° C. in the range of about 6000-7500 Pa·sec.

The melt tangent delta is the tangent of the phase angle (the delay between the applied force and material response) and is the ratio of loss to elasticity, sometimes also referred to as damping. Unless otherwise specified, as used herein, the melt tangent delta, is measured by dynamic mechanical analysis using a parallel plate rheometer at 230° C., 1% strain rate, and 0.1 rad/s frequency according to ASTM D4440-2015 or ISO 6721. Unless otherwise specified, the melt complex viscosity, as used herein, is measured by dynamic mechanical analysis using a parallel plate rheometer at 230° C., 1% strain rate, and 0.1 rad/s frequency according to ASTM D4440-2015 or ISO 6721.

The filler in the substrate layer 22 and cap layer 24 can be the same or different. Non-limiting examples of suitable fillers include talc, mica, calcium carbonate, and combinations thereof. According to one aspect of the present disclosure, the same type of filler can be used in both the substrate composition and the cap composition, but at least one characteristic of the filler is different between the substrate composition and the cap composition. Examples of filler characteristics include filler particle size (e.g., diameter), shape, or aspect ratio. For example, the substrate composition can include a talc filler having an average particle size, such as diameter, that is different than an average particle diameter of a talc filler present in the cap composition.

In one aspect of the present disclosure, the filler is added to the substrate composition and the cap composition as a filler masterbatch that includes the filler in a polyolefin-based carrier, such as polypropylene. The amount of filler masterbatch added to each of the substrate and cap compositions can be selected to provide a desired amount of filler in the formed substrate and cap layers 22 and 24, respectively. The ratio of filler to carrier in a given masterbatch can be used to determine the amount of filler masterbatch to add to provide the desired amount of filler.

For example, commercially available filler masterbatches suitable for the present disclosure generally include about 40 to 60 wt. % of filler. One example of a suitable commercially available filler masterbatch is HT6HP from Heritage Plastics, which is described as 60% talc in a polypropylene homopolymer filler. Another example of a suitable commercially available filler masterbatch is SUKANO® p-ma-218 from Sukano Polymers Corporation, U.S.A., which is described as a talc filler in a polypropylene homopolymer filler. When a filler masterbatch is used, the carrier can be considered as an additional polyolefin in the composition (e.g., secondary, tertiary, etc. as the case may be).

The amount and type of filler present in the substrate and cap compositions can be selected to provide the multi-layer sheet 20 and the lid 10 formed from the multi-layer sheet 20 with the desired characteristics. In one aspect of the present disclosure, the type and amount of filler present in each of the substrate and cap compositions is selected to provide the lid 10 with a stiffness that is at least comparable to and optionally greater than that of a similar lid made from unexpanded HIPS. In another aspect, the type and amount of filler present in each of the substrate and cap compositions is selected to provide the lid 10 with a density less than 1 g/cm$^3$ at 23° C. In another aspect, the type and amount of filler present in the cap composition is selected to provide the cap layer 24 with a matte finish having a gloss level of about 6 gloss units or less. In one aspect of the present disclosure, the amount and type of filler present in the substrate and cap compositions is selected to provide the lid 10 with a stiffness that is at least comparable to and optionally greater than that of a similar lid made from unexpanded HIPS, a density less than 1 g/cm$^3$ at 23° C., and a matte finish having a gloss level of about 6 gloss units or less.

The gloss level referred to herein was determined using a gloss meter at a 60 degree measurement angle. The gloss meter was used to take a gloss level measurement at multiple locations of the test sample and the highest reading was recorded. The measurement values for the gloss meter are related to the amount of reflected light from a calibration standard for defining a standard gloss unit according the instructions provided by the manufacturer of the gloss meter, as is known in the art.

In one aspect of the present disclosure, the amount of filler present in the substrate and cap compositions is selected to provide the multi-layer sheet 20 with a total filler content of about 12 wt. % or less based on the weight of the multi-layer sheet 20 such that the lid 10 has a density less than 1 g/cm$^3$ at 23° C. In one example, the substrate and cap compositions include about 15 to 30 wt. % of a filler masterbatch that includes about 40 to 60 wt. % of the filler in a polyolefin-based carrier. The filler masterbatch can be the same or different in the substrate and cap compositions.

In one aspect of the present disclosure, the substrate composition includes a filler masterbatch and the cap composition includes a different filler masterbatch having particles with an average diameter that is greater than the filler particles in the substrate composition. In this example, the substrate composition includes about 15 to 20 wt. % of the filler masterbatch and the cap composition includes about 20 to 30 wt. % of the filler masterbatch.

The substrate and cap compositions can optionally include additives to provide the lid 10 with the desired characteristics, examples of which include colorants and processing aids. The additives in the substrate and cap compositions can be the same or different. In one aspect of the present disclosure, the substrate and cap compositions include a colorant, an example of which includes titanium dioxide. One example of a suitable commercially available colorant is Standridge blue white concentrate (blue white) which includes titanium dioxide and optionally calcium carbonate. Another example is Ferro CH27043 2FDA from Ferro Corporation, U.S.A. The colorant can be provided in one or both of the substrate and cap layers 22, 24 in an amount suitable to provide the lid with the desired appearance. In one example, the colorant is present in one or both of the substrate and cap layers 22, 24 in a range of about 1-4 wt. %, optionally about 2-3 wt. %.

The total thickness of the multi-layer sheet 20 (i.e., the thickness of the substrate layer 22 plus the thickness of the cap layer 24), when used for forming lids, can be about 0.035 inches or less, optionally about 0.025 inches or less. The thickness of the lid formed from the multi-layer sheet 20 can vary depending on the lid design, but can be less than about 0.01 inches, optionally less than about 0.015 inches, further optionally less than about 0.025 inches, still further optionally less than about 0.035 inches, and further optionally within the range of about 0.015 to 0.020 inches. In one aspect of the present disclosure, the cap layer 24 forms about 10 to 20 percent of the total thickness of the multi-layer sheet 20. For example, the multi-layer sheet 20 can have a total thickness of about 0.018 to 0.19 inches, including a cap layer 24 having a thickness of about 0.002 to 0.003 inches.

The multi-layer sheet 20 can be formed into a lid having the desired shape and dimensions by thermoforming. Non-limiting examples of thermoforming can include vacuum molding, pressure molding, plug-assist molding, and vacuum snapback molding. The thermoforming process can include heating the multi-layer sheet (also referred to as a web) to a melting or softening temperature and then stretching or drawing the sheet over a mold. The web can be stretched or drawn over the mold while the web is still in a soft or molten state from the extrusion process without the application of heat from a heating unit. Optionally, the thermoforming process includes a heating unit, such as an oven, to reheat the web to a molten or soft state suitable for thermoforming. The material can be maintained over the mold as the material cools and solidifies to form the article. The formed article can then be trimmed from the thermoformed sheet and removed from the mold to form the lid. Optionally, the trimmed material is reground and processed for further use as regrind, alone or in combination with virgin polyolefin.

The multi-layer sheet 20 can be fed from the extruder to a molding station where the thermoforming takes place or stored for further processing. In one example, the sheet is fed from the extruder to the molding station prior to the sheet cooling to room temperature and additional heat is optionally supplied to the sheet prior to forming the sheet around the mold. When the extruded sheet is stored prior to molding, heat is supplied to the sheet prior to forming the sheet around the mold. Heat for facilitating molding of the sheet during thermoforming can be supplied in any suitable manner, examples of which include radiant heat and heated air. Optionally, the thermoforming process includes blowing air onto the sheet to facilitating pressing the sheet about the mold. In another example, the thermoforming process can include vacuum molding in which the sheet is forced against the mold by a vacuum. Thermoforming can include a solid-phase forming process (e.g. using a reciprocating former) or a melt-phase forming process.

EXAMPLES

Example 1

Table 1 below illustrates the characteristics of hot cup lids made according to the present disclosure from a multi-layer sheet ("Multi-Layer Samples") in comparison with a conventional HIPS lid ("HIPS Comparative Sample") and a lid made from a single layer polypropylene sheet ("Single Layer Comparative Sample").

Multi-Layer Samples 1 and 2 were made by co-extruding a substrate composition and a cap composition according to the present disclosure through a single stage screw rotary extruder according to conventional extrusion processes to form a multi-layer sheet. The multi-layer sheet was used to form a cup lid having the shape of the lid of FIG. 1 by thermoforming, as described above. The exemplary substrate composition includes 81.33 wt. % Inspire® 6025N from Braskem, 16.67 wt. % HT6HP talc masterbatch from Heritage Plastics, and 2 wt. % Standridge blue white concentrate. The exemplary cap composition includes 72 wt. % Polybatch® DUL3636 polyethylene/polypropylene blend from Schulman, 25 wt. % SUKANO® p-ma-218 talc masterbatch from Sukano Polymers Corporation, and 3 wt. % Standridge white concentrate.

The HIPS Comparative Sample is a conventional HIPS lid that was made according to the same procedures as the Multi-Layer Samples 1 and 2, except only a single layer of the HIPS composition is extruded.

The Single Layer Comparative sample lid was made according to the same procedures as the Multi-Layer Samples 1 and 2, except only a single layer of a polypropylene-based composition is extruded. The single layer polypropylene-based composition includes 80.33 wt. % Inspire® 6025N from Braskem, 16.67 wt. % HT6HP talc masterbatch from Heritage Plastics, and 3 wt. % CH27043 2FDA from Ferro Corporation, U.S.A.

Figure 3:
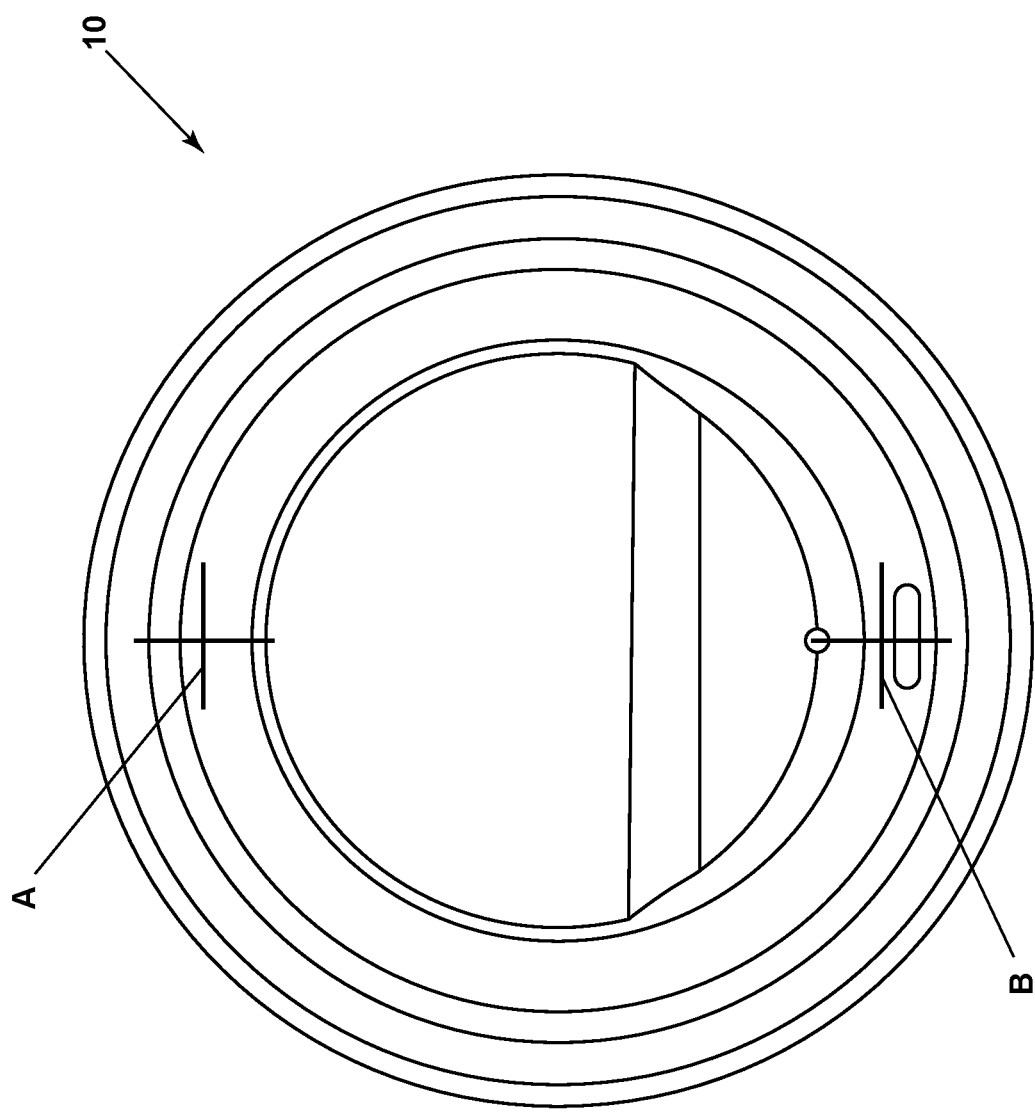
FIG. 3 is a top-down schematic view of a hot cup lid indicating the deflection test measurement points according to an aspect of the disclosure.

The stiffness of the Multi-Layer Sample and Comparative Sample lids were analyzed using a hot deflection test which measures the weight required to deflect the lid by 0.25 inches at two different points on the lid. The hot deflection test was conducted on lids that were placed on a coffee cup holding coffee at 200° F. FIG. 3 schematically illustrates the locations on the lid, Point A and Point B, at which the deflection tests were conducted.

TABLE 1

Multi-Layer Sample and Comparative Sample Comparison

| Lid | Avg. Weight (g) | Avg. Diameter (inches) | Avg. Thickness* (inches) | 0.25" Hot Deflection (kg) | |
|---|---|---|---|---|---|
| | | | | Point A | Point B |
| Multi-Layer Sample 1 | 4.00 | 3.465 | 0.015 | 2.733 | 3.324 |
| Multi-Layer Sample 2 | 3.62 | 3.515 | 0.016 | 2.427 | 2.086 |
| HIPS Comparative Sample | 3.46 | 3.480 | 0.013 | 2.915 | 3.108 |
| Single Layer Comparative Sample | 3.66 | 3.486 | 0.014 | 3.144 | 2.813 |

*Measured at the center of the lid.

The hot deflection data in Table 1 demonstrates that Multi-Layer Sample lids made according to the present disclosure have a comparable stiffness to a conventional HIPS lid in a hot beverage setting. The Multi-Layer Sample lids also have a comparable part weight to that of the conventional HIPS lid. The data in Table 1 demonstrates that the Multi-Layer Sample lids made according to the present disclosure are suitable for replacement of HIPS lids in a hot food service setting.

The Multi-Layer Sample lids also had a gloss level on the exterior side of the lid of less than 6 gloss units, providing the Multi-Layer Sample lids with a matte finish that some consumers find aesthetically pleasing. In contrast, the Single Layer Comparative Sample lid, while having a comparable stiffness to a conventional HIPS lid, had a glossy appearance, which some consumers find undesirable. The Single Layer Comparative Sample lids have a gloss level of about 20 to 25 gloss units. The Multi-Layer Sample lids according to the present disclosure satisfy the dual requirements of having a desired matter appearance and being capable of replacing a convention HIPs lid.

In addition, the Multi-Layer Sample lids all had a density less than 1 g/cm$^3$ at 23° C. Both the Multi-Layer Sample lids and the Single Layer Comparative Sample lids have a density in the range of about 0.98 to 0.999 g/cm³. Thus, the Multi-Layer Sample lids according to the present disclosure can provide a lid which has comparable stiffness to allow the lid to perform as a replacement lid for conventional HIPS lids in a hot food service setting, is recyclable in a water-based recycling stream, and has a matte appearance.

Example 2

The samples from Example 1 were also evaluated using a hot creamer and a hot oil test to assess the resistance of the lids to environmental stress cracking.

Hot creamer test protocol:

The Multi-Layer Sample 1 and 2 lids, HIPS Comparative Sample lid, and Single Layer Comparative Sample lid were evaluated on matching cups. Coffee was brewed and heated to a temperature of 212° F. The cups were filled with the coffee to within 0.5 inches of the brim.

Two packs (½ ounce, 12 mL) of cream were added to each cup and dairy whip cream was sprayed to top the liquid level. The cream includes mono and diglycerides. The spray dairy whip cream includes cream and nonfat milk with mono and diglycerides.

The lids are applied to the filled cups and the lidded cups are placed on a flat surface. The lidded cups are gently rocked every 15 seconds for half a minute to bring the contents of the cup into contact with the inside surface of the lid.

The cups are then allowed to sit at room temperature and observed for 2 hours for cracking around the lid edges. Following the end of the 2 hour time period, the lids are gently removed. The lids are gently flexed and carefully observed for cracks or splits by visual inspection and touch. Any cracks or splits in the lid is considered a failure.

Hot oil test protocol:

The lid samples were evaluated for structural integrity when weighted in a hot oil bath. Vegetable oil is heated to 160° F. prior to submersing the lids. The lids are placed on a plate above the oil level and a Teflon weight weighing about 803 grams is set on top of each lid. The plate with the weighted lids is lowered into the heated oil until completely submerged. A timer is started at the point at which the lids initially touch the surface of the oil. The time at which each lid exhibits signs of failure is recorded. Failure is defined as the appearance of any cracks, splits, or breaks in the lid. A lid is considered to have failed the hot oil test if signs of failure occur within 5 minutes of submersion; a lid is considered to have passed the hot oil test if signs of failure occur more than 5 minutes after submersion in the hot oil.

Table 2 below summarizes the results of the hot creamer and the hot oil tests for the Multi-Layer Sample 1 and 2 lids, HIPS Comparative Sample lid, and Single Layer Comparative Sample lid.

TABLE 2

Hot Creamer and Hot Oil Evaluation

| Lid | Hot Creamer Number of Fails | Hot Oil Number of Fails |
|---|---|---|
| Multi-Layer Sample 1 | 0 | 0 |
| Multi-Layer Sample 2 | 0 | 0 |
| HIPS Comparative Sample | 0 | 1 |
| Single Layer Comparative Sample | 0 | 0 |

The results of the hot creamer and hot oil evaluations demonstrate that the Multi-Layer lids according to the present disclosure perform just as well and sometimes even better than the conventional HIPS lid in hot food conditions. The HIPS Comparative Sample lid failed at 4.18 minutes.

Example 3

The tensile strength of the Multi-Layer Sample 1 and 2 lids, HIPS Comparative Sample lid, and Single Layer Comparative Sample lid of Example 1 was also evaluated. The tensile strength of the lid skirt was evaluated at the 3, 9, and 12 o'clock positions (with the drink opening defining the 6 o'clock position). The tensile strength for each lid was determined as the average at all 3 positions. The average tensile strength for the Multi-Layer Sample 1 and 2 lids was higher than the both the HIPS Comparative Sample lid and the Single Layer Comparative sample lid.

The multi-layer sheets according to the present disclosure can be used to form lids suitable for replacement for conventional HIPS lids which are also recyclable using water-based recycling streams and also have the desired aesthetic matte appearance. The lids made according to the present disclosure have characteristics that allow the lids to be used in place of conventional HIPS lids including comparable or better stiffness, hot oil and hot creamer performance, and tensile strength. The lids of the present disclosure also have a density less than 1 g/cm³ at 23° C., allowing the lids to be recycled in a water-based recycling stream. In addition, the lids of the present disclosure have a low gloss level providing the lid with a matte finish that some consumers find desirable.

Conventional methods for increasing the strength of an extruded polymeric material include increasing the amount of filler in the extrudate. Increasing the amount of filler can also be used to decrease the gloss level of an extruded polymeric material. However, incorporating higher amounts of filler to achieve both the desired strength and low gloss characteristics can increase the density of the material. The increase in density can result in the lids having a density greater than 1 g/cm³ at 23° C., and thus the lids would not be recyclable in a water-based recycling stream. The multi-layer sheet and lid of the present disclosure provides a material that has the desired stiffness, hot oil and hot creamer performance, and tensile strength for use as a replacement for HIPS as well as a density that allows the lids to be recycled in a water-based recycling stream in combination with a low gloss level of about 6 gloss units or less to provide the desired matter appearance.

The following clauses define additional aspects of the present disclosure which are encompassed herein. These aspects can be combined as desired to form combinations that are encompassed by the present disclosure.

According to an aspect of the present disclosure, a multi-layer sheet from which a lid for a food or beverage container can be made can include a substrate layer comprising a first polyolefin-based composition including at least a first polyolefin and a first filler, and a cap layer comprising a second polyolefin-based composition including at least a second polyolefin, different than the first polyolefin, and a second filler, wherein the multi-layer sheet has a density less than 1 g/cm³ at 23° C., which can optionally be combined with any one or any combination of the following features: the first filler can be present in the first polyolefin-based composition as a first filler masterbatch present at about 15 to 20 wt. % of the first polyolefin-based composition; the first filler masterbatch can include about 40 to 60 wt. % of the first filler in a polyolefin-based carrier; the second filler can be present in the second polyolefin-based composition as a second filler masterbatch present at about 20 to 30 wt. % of the second polyolefin-based composition; the second filler masterbatch can include about 40 to 60 wt. % of the second filler in a polyolefin-based carrier; the first filler can have an average particle size that is different than an average particle size of the second filler; at least one of the substrate layer, the cap layer, or both can include a colorant; and/or the colorant can be selected from the group including titanium dioxide, calcium carbonate, or combinations thereof.

According to an aspect of the present disclosure, a process for forming a lid for a food or beverage container includes extruding a substrate layer including a first polyolefin-based composition including at least a first polyolefin and a first filler, co-extruding a cap layer adjacent a first side of the substrate layer to form a multi-layer sheet, the cap layer including a second polyolefin-based composition including at least a second polyolefin, different than the first polyolefin, and a second filler, and forming the multi-layer sheet into the shape of a lid, wherein the lid has a density less than 1 g/cm$^3$ at 23° C., which can optionally be combined with any one or any combination of the following features: the first polyolefin-based composition can be provided by adding about 15 to 20 wt. % of a first filler masterbatch including the first filler in a polyolefin-based carrier to the at least a first polyolefin; the first filler masterbatch can include about 40 to 60 wt. % of the first filler in the polyolefin-based carrier; the second polyolefin-based composition can be provided by adding about 20 to 30 wt. % of a second filler masterbatch including the second filler in a polyolefin-based carrier to the at least a second polyolefin; the second filler masterbatch can include about 40 to 60 wt. % of the second filler in the polyolefin-based carrier; the first filler can have an average particle size that is different than an average particle size of the second filler; at least one of the substrate layer, the cap layer, or both can include a colorant; and/or the colorant can be selected from the group including titanium dioxide, calcium carbonate, or combinations thereof.

To the extent not already described, the different features and structures of the various aspects of the present disclosure may be used in combination with each other as desired. For example, one or more of the features illustrated and/or described with respect to one of the aspects of the present disclosure can be used with or combined with one or more features illustrated and/or described with respect to the other aspects. That one feature may not be illustrated in all of the aspects is not meant to be construed that it cannot be, but is done for brevity of description. Thus, the various features of the different aspects may be mixed and matched as desired to form new aspects, whether or not the new aspects are expressly described.

While the present disclosure has been specifically described in connection with certain specific aspects thereof, it is to be understood that this is by way of illustration and not of limitation. Reasonable variation and modification are possible within the scope of the forgoing disclosure and drawings without departing from the spirit of the present disclosure which is defined in the appended claims.

What is claimed is:

1. A lid for a food or beverage container made from a multi-layer sheet, the multi-layer sheet comprising:
   a substrate layer comprising a first polyolefin-based composition including at least a first polyolefin and a first filler; and
   a cap layer forming an exterior side of the lid and comprising a second polyolefin-based composition including at least a second polyolefin, different than the first polyolefin, and a second filler, the cap layer having a gloss level of about 6 gloss units or less, and wherein a thickness of the cap layer is about 10-20% of a total thickness of the multi-layer sheet;
   wherein the multi-layer sheet has a density less than 1 g/cm$^3$ at 23° C.

2. The lid of claim 1 wherein the first polyolefin comprises a polypropylene copolymer or a polypropylene homopolymer.

3. The lid of claim 1 wherein the first polyolefin comprises a polypropylene polymer having a flexural modulus of at least 290,000 psi.

4. The lid of claim 1 wherein the first polyolefin comprises a high crystalline polypropylene.

5. The lid of claim 1 wherein the first and second filler are present such that a total filler content of the multi-layer sheet is about 12 wt. % or less.

6. The lid of claim 1 wherein the first filler, the second filler, or both the first and second filler are selected from the group consisting of talc, mica, calcium carbonate, and combinations thereof.

7. The lid of claim 1 wherein the second polyolefin comprises polyethylene, high density polyethylene, or an ethylene-propylene copolymer.

8. The lid of claim 7 wherein the second polyolefin-based composition includes a third polyolefin comprising a polypropylene copolymer or a polypropylene homopolymer.

9. The lid of claim 1 wherein the second polyolefin-based composition comprises a blend of a polyethylene and a polypropylene.

10. The lid of claim 9 wherein the blend has a melt tangent delta at 230° C. in the range of about 1-2.5.

11. The lid of claim 9 wherein the blend has a melt complex viscosity at 230° C. in the range of about 6000-7500 Pa·sec.

12. The lid of claim 1 wherein the first polyolefin is present at about 80 to 90 wt. % of the first polyolefin-based composition.

13. The lid of claim 1 wherein the substrate layer and the cap layer are co-extruded layers.

14. A process for forming a lid for a food or beverage container, the process comprising:
   extruding a substrate layer comprising a first polyolefin-based composition including at least a first polyolefin and a first filler;
   co-extruding a cap layer adjacent a first side of the substrate layer to form a multi-layer sheet, the cap layer comprising a second polyolefin-based composition including at least a second polyolefin, different than the first polyolefin, and a second filler, the cap layer having a gloss level of about 6 gloss units or less, and wherein a thickness of the cap layer is about 10-20% of a total thickness of the multi-layer sheet; and
   forming the multi-layer sheet into the shape of a lid, the cap layer forming an exterior side of the lid;
   wherein the lid has a density less than 1 g/cm$^3$ at 23° C.

15. The process of claim 14 wherein the first polyolefin comprises a polypropylene copolymer or polypropylene homopolymer.

16. The process of claim 14 wherein the first polyolefin comprises a polypropylene polymer having a flexural modulus of at least 290,000 psi.

17. The process of claim 14 wherein the first polyolefin comprises a high crystalline polypropylene.

18. The process of claim 14 wherein the first and second filler are present such that a total filler content of the multi-layer sheet is about 12 wt. % or less.

19. The process of claim 14 wherein the first filler, the second filler, or both the first and second filler are selected from the group consisting of talc, mica, calcium carbonate, and combinations thereof.

20. The process of claim 14 wherein the second polyolefin comprises polyethylene, high density polyethylene, or an ethylene-propylene copolymer.

21. The process of claim 14 wherein the second polyolefin-based composition includes a third polyolefin comprising a polypropylene copolymer or a polypropylene homopolymer.

22. The process of claim 14 wherein the first polyolefin is present at about 80 to 90 wt. % of the first polyolefin-based composition.

23. The process of claim 14 wherein the second polyolefin-based composition comprises a blend of a polyethylene and a polypropylene.

24. The process of claim 23 wherein the blend has a melt tangent delta at 230° C. in the range of about 1-2.5.

25. The process of claim 23 wherein the blend has a melt complex viscosity at 230° C. in the range of about 6000-7500 Pa·sec.

* * * * *